United States Patent [19]

Cacace

[11] Patent Number: 5,051,315

[45] Date of Patent: Sep. 24, 1991

[54] COMPACTING SCRAP METAL IN A TUBE FOR RECYCLING

[75] Inventor: Antonino G. Cacace, Swansea, United Kingdom

[73] Assignee: Camborne Industries PLC, Neath, United Kingdom

[21] Appl. No.: 586,540

[22] Filed: Sep. 21, 1990

[51] Int. Cl.⁵ ................................................ B22F 7/00
[52] U.S. Cl. ..................................... 428/549; 428/558; 428/600; 428/192; 428/542.8; 428/584; 428/585
[58] Field of Search ............... 428/549, 558, 600, 192, 428/542.8, 584, 585

[56] References Cited

U.S. PATENT DOCUMENTS

| | | | |
|---|---|---|---|
| 3,780,418 | 12/1973 | Hurst | 428/548 |
| 3,837,066 | 9/1974 | Mori et al. | 428/585 |
| 3,847,556 | 12/1974 | Gervais | 428/600 |
| 3,915,693 | 10/1975 | Rasmussen | 428/558 |
| 3,941,570 | 3/1976 | Couchman | 428/548 |
| 4,259,413 | 3/1981 | Taglang et al. | 428/548 |
| 4,631,236 | 12/1986 | Roctyn | 428/558 |
| 4,752,334 | 6/1986 | Nadkarni et al. | 428/558 |

*Primary Examiner*—Stephen J. Lechert, Jr.
*Attorney, Agent, or Firm*—Young & Thompson

[57] ABSTRACT

A method is disclosed of making a billet comprising a mass of compressed swarf jacketed in a tubular jacket. A number of similar indentations are formed in the ends of the jacket. The indentations are symmetrically disposed about the axis of the billet. The indentations terminate at terminal positions spaced from the ends of the billet and increase in depth from the terminal positions to the ends of the billet. Jackets of various materials are envisaged, in particular of stainless steel and mild steel. Where the jacket is of stainless steel tubular end pieces of mild steel in which the indentations are formed may be welded thereon.

6 Claims, 3 Drawing Sheets

COMPACTING SCRAP METAL IN A TUBE FOR RECYCLING

FIELD OF THE INVENTION

This invention relates to the recycling of scrap metal. It has particular application to recycling by rolling or otherwise hot-working a billet made up of scrap metal swarf compacted in a tubular jacket.

The term "swarf" comprehends the off cuts from machining operations in general and is intended to include the off cuts from turning, boring, shaping and milling operations on engineering steels. The fine off cuts from some stamping and punching operations may also be suitable. The term "engineering steel" is intended to describe those low alloy steels which are commonly subjected to machining operations including mild steel (a term which itself includes carbon steel), forging steel and axle or shaft steel all of which contain significant amounts of carbon.

DESCRIPTION OF PRIOR ART

In British patent #1313545 there is disclosed, inter alia, a process in which steel swarf is pressed into compact masses (which for convenience will be called "briquettes"). The briquettes are pressed together and jacketed in a closed tube, usually of steel or stainless steel. The billet so formed is then heated and worked by a process such as rolling into a finished or semi-finished product.

The forming of the briquettes may take place in a cavity die prior to being jacketed. Alternatively briquettes may be formed directly in the bore of the tube. In this case the tube is inserted in a supporting die during the compaction process and the bore of the tube serves as the cavity. In either case the compaction is carried out by means of a press having a ram which presses a quantity of the swarf previously inserted in the cavity into a briquette. The ram is then withdrawn and a new charge of swarf is inserted in the cavity. The ram is again inserted in the cavity to form a new briquette pressed up against the earlier formed briquette. The cycle is repeated until the cavity is substantially filled up with briquettes.

During the heating the oxides on the swarf inside the jacketing tube are reduced and during the working process the metal particles of which the briquettes are composed are consolidated into a unitary mass which are sintered to each other and to the jacket.

The reduction of oxides on the swarf occurs as a result of the combination thereof with carbon which is either introduced into the jacket or which diffuses out of the steel or other metal of which the swarf is composed. The jacketing tube serves to maintain reducing conditions within the billet. Attempts to produce an acceptable hot worked product from a billet of unjacketed swarf have been unsuccessful even when great care was taken to try to prevent atmospheric oxygen from getting to the hot billet.

Billets comprising mild steel jackets are commercially important since they can be used to make finished or semi-finished products at low cost. However, another commercially and technically important product of the process is a billet comprised of a stainless steel jacket filled with briquettes of mild steel or carbon steel which can be worked into a finished product having the desirable properties and low cost of engineering steel but which has a corrosion resistant stainless steel cladding.

A product comprising a core of steel clad with a non-ferrous metal such as copper also has commercial potential.

Billets comprising tubes filled with compacted swarf have presented special problems at the rolling stage. It is advantageous to taper the ends of the jacket to reduce the "angle of bite" to enable the billet more easily to enter the rolls. This is especially true in the case of a billet comprising a stainless steel jacket since the coefficient of friction between such a jacket and the rolls is less than between a mild steel jacket and the rolls.

In some of the billets which have previously been produced the ends have been partially or wholly closed for the purpose of excluding or at least reducing the free access of atmospheric oxygen to the swarf enclosed in the jacket. One of the methods used to close the billet has been to crimp the ends of the jacket over the end faces of the core. While the crimping of the ends of the jacket has resulted in a billet in which the ends are in effect tapered it is still difficult to feed the billet into the rolls and an excessive proportion of the ends of the rolled product are as a consequence mis-shapen or otherwise defective and must be sheared off and discarded. From a cost point of view this is particularly important when the jacket is of stainless steel or copper.

It is an object of the invention to provide a billet in which entry into the rolls is eased.

SUMMARY OF THE INVENTION

According to the invention there is provided a method of forming a billet comprising a mass of compressed swarf jacketed in a tubular jacket, characterised in forming in the jacket adjacent at least one end of the billet a number of substantially similar indentations each of which terminates at a terminal position spaced from the said one end of the billet and which increases in depth from the terminal position to the said one end of the billet.

In one form of the invention the jacket comprises a first portion joined to an end piece in which the indentations are formed, the first portion and the end piece being of materials of different composition.

According to one aspect of the invention the end piece is of engineering steel. According to another aspect of the invention the first portion is of stainless steel.

Advantageously the billet has a longitudinal axis about which the indentations are symmetrically disposed. Each indentation advantageously comprises two walls which are symmetrically disposed one on either side of a line of intersection lying in a plane through the longitudinal axis.

According to one aspect of the invention the indentations are formed in each end of the jacket at the same time.

Further according to the invention there is provided a method of recycling swarf, characterised in including the steps of forming a billet as envisaged herein and rolling the billet to form a rolled product. The ends of the product embodying the remnant indentations or end pieces are of course discarded.

BRIEF DESCRIPTION OF THE DRAWINGS

The invention is further described by way of example with reference to the accompanying drawings in which.

DETAILED DESCRIPTION OF THE EXAMPLES SHOWN IN THE DRAWINGS

Figure 1:
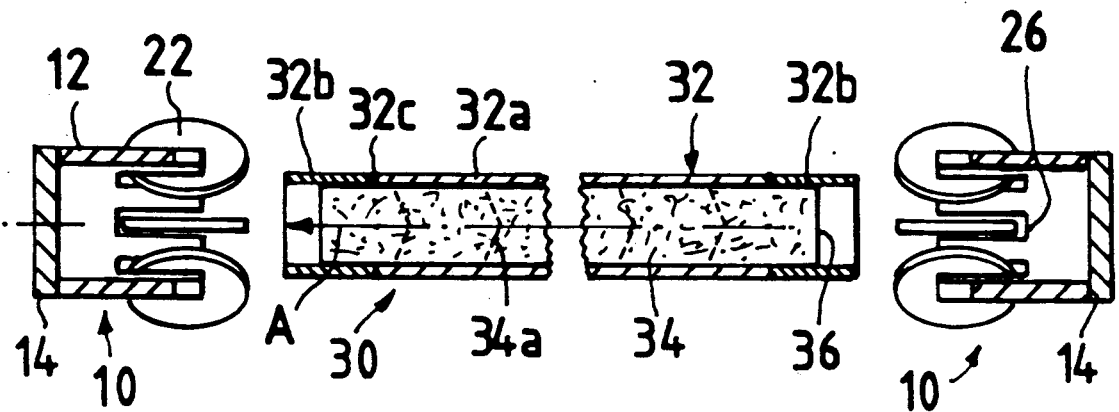
FIG. 1 is a somewhat schematic cross-sectional side view of a billet located between end-forming assemblies.
Figure 2:
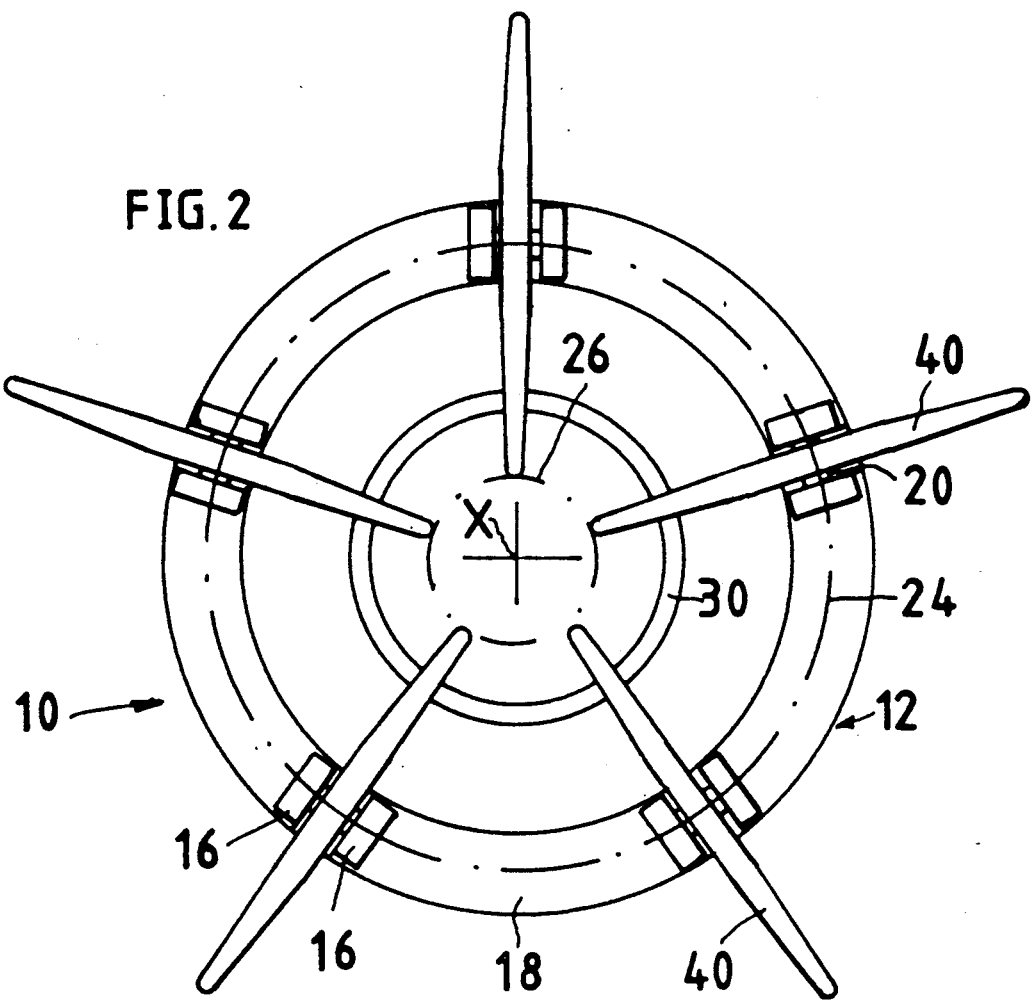
FIG. 2 is an enlarged view on Arrow A in FIG. 1 of one of the end-forming assemblies.
Figure 3:
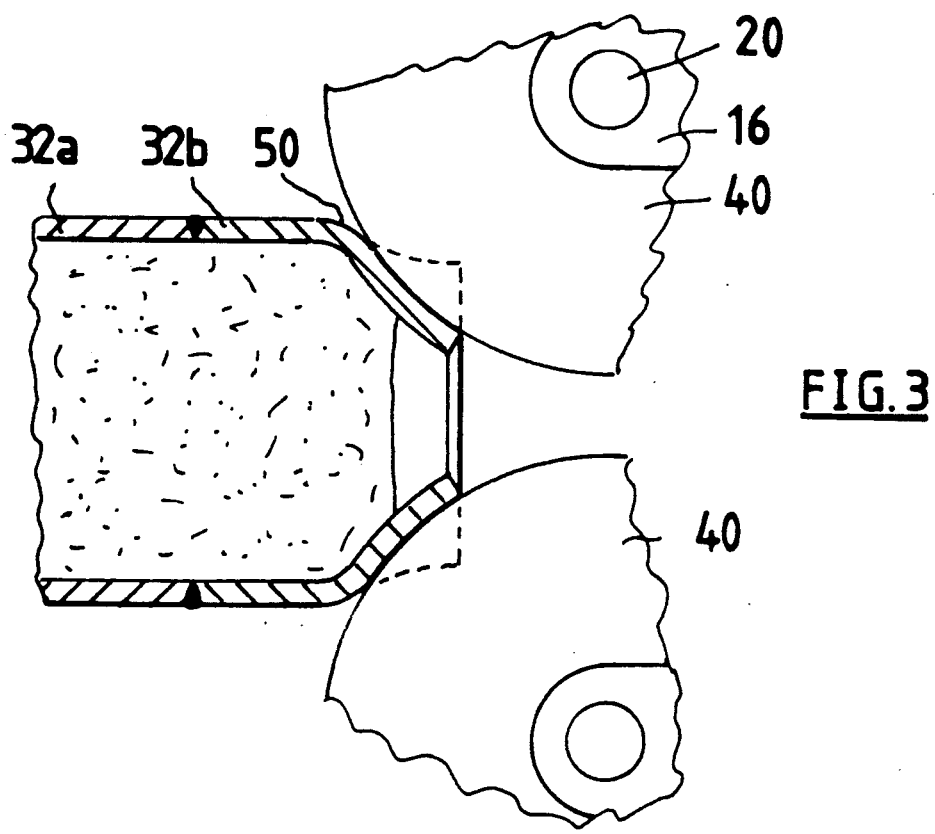
FIG. 3 is a sectional side view of one end of the billet in the process of being pushed into an end-forming assembly.

The two end-forming assemblies 10 shown in FIG. 1 are mutually identical so only one will be described. It comprises a high tensile steel sleeve 12 joined to a base plate 14 at one end. The base plate 14 is provided with bolt holes or the like (not shown) by means of which the assembly is mounted on the head of the ram of a hydraulic press (also not shown). Five pairs of trunnions 16 (see FIG. 2) are mounted on the end face 18 of the sleeve opposite the base plate. The pairs of trunnions are equally spaced about the end of the sleeve. The trunnions in each pair are spaced from one another along the circumference of the sleeve and are thus symmetrically disposed about the longitudinal axis X of the sleeve. A hardened steel axle 20 is supported between each pair of trunnions. Each axle is disposed with its axis tangential to a common circle (indicated at 24) having its centre on the longitudinal axis X. Mutually identical hardened steel rollers 40 are mounted one on each axle. The rollers are slim in cross section, each tapering inwardly from its centre towards its periphery. Slots 26 are cut into the sleeve 12 between the trunnions to accomodate the rollers 40.

The billet 30 shown in FIG. 1 comprises a jacket 32 containing a core 34 made up of mild steel or other engineering steel swarf compacted into briquettes. The interfaces between the briquettes are indicated at 34a. The interfaces are formed with interengaging protuberances and recesses which help to prevent separation of the briquettes during the subsequent rolling operation. Prior to compaction the swarf should be cleaned and crushed as described in British patent #1313545. Swarf so treated will still have normal surface oxidation. This oxidation will be removed when the billet is heated. It may however be preferable to use swarf which, after cleaning and crushing, has been preheated and allowed to cool in reducing conditions to remove the surface oxides.

The jacket 32 is comprised of a welded tube 32a of austenitic stainless steel to each end of which an open ended sleeve or end piece 32b of mild steel is butt welded, as indicated at 32c. Typically the stainless steel tube is about 100 mm in diameter and 85 cm in length. Each end piece is 15 cm long so that the overall length of the jacket is 100 cm. The jacket could alternatively be comprised entirely of a tube of stainless steel or mild steel. In yet another alternative the jacket might be comprised entirely of copper or of a central tube of copper to each end of which mild steel end pieces are brazed.

The core is formed substantially in the manner described in British patent #1313545. Successive charges of the swarf are fed into the bore of the tube through the end piece 32b at, say, the left hand end of the tube. A hydraulic press is used to compact each load in turn into a briquette. The press comprises a ram which is extended into the bore of the tube from the left hand end. The first load of swarf is compacted between the ram against a stop at the right hand end of the tube to form the first briquette. Each subsequent load of swarf is compacted by the ram against the last-formed briquette. Pressing of briquettes continues until the jacket 32 is substantially filled up. A small space is left in the bore between the end 36 of the core and each end of the jacket. Typically there would be twenty three briquettes each about 4 cm long in a completed billet. about The core should in any case project well into the sleeve 32b at each end of the jacket.

The press may alternatively comprise two rams which are extended one into each end of the tube. In this case the first briquette is formed at the longitudinal centre of the tube and loads of swarf are thereafter fed into each end of the tube so that two briquettes are formed in each subsequent cycle of the press.

The geometry of the assembly 10 is such that the outer diameter of the jacket 32 is less than the internal diameter of the sleeve 12 but greater than the diameter of the smallest circle (indicated at 26) which intersects the rollers 40. In one example, where rollers of 150 mm diameter are used with a billet of 100 mm diameter, the diameter of the circle 26 is about 20 mm.

In use the assemblies 10 are mounted on rams which are coaxially disposed facing one another with their axes in alignment. The billet 30 is located in a holding fixture or die (not shown) so as also to be in axial alignment with the rams. The two rams are extended so that the assemblies 10 engage the ends of the tube. Further extension of the rams causes the rollers to ride over the ends of the tube, each roller forming an indentation 42 extending along the tube. The provision of more than three rollers in each assembly 10 causes the tube to centre itself so that its longitudinal axis is in alignment with the longitudinal axes X of the assemblies 10. The rolling action of the rollers substantially reduces the pressure required to form the indentations. A force of about 80 tonnes is required to form the ends of a billet having a jacket of 6 mm wall thickness and 100 mm diameter.

Figure 4:
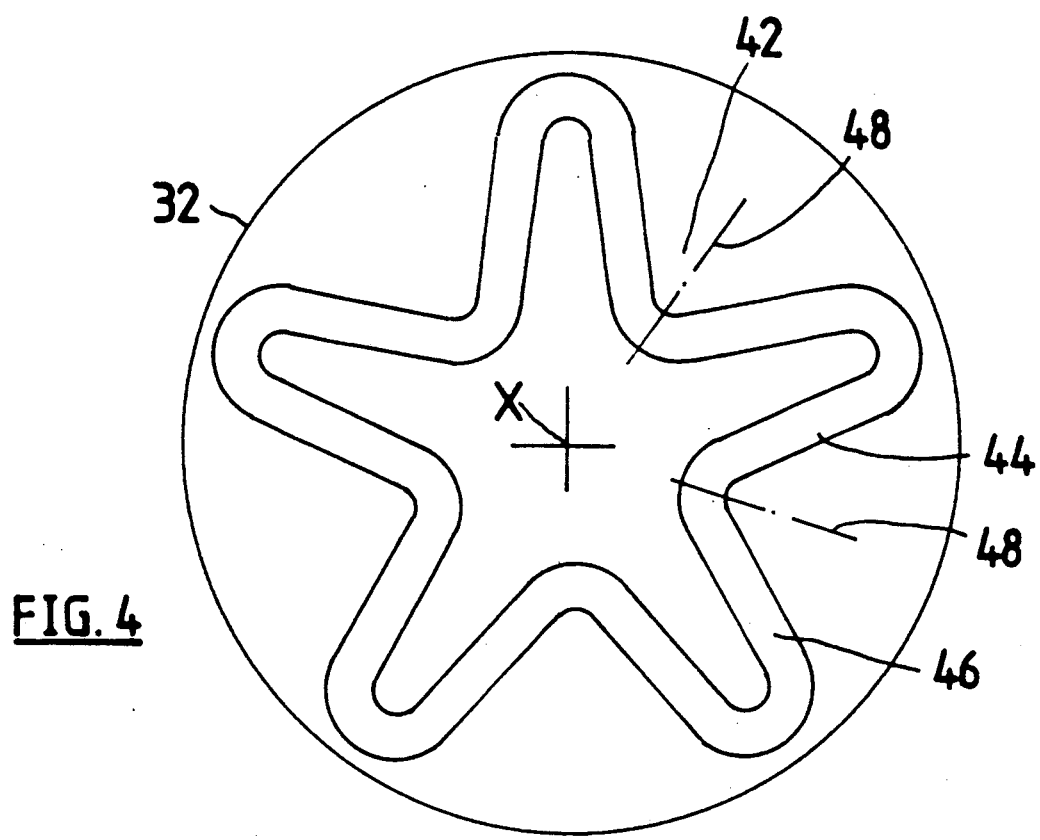
FIG. 4 is an end view of a billet, the forming of the end of which is nearly complete.

Each tube end is formed into the shape of a five pointed star substantially as shown in FIG. 4. Five indentations 42 are formed in the tube end disposed symmetrically about the longitudinal axis X of the billet. Each indentation comprises two walls 44, 46 which are symmetrically disposed one on either side of a line of intersection 48 lying in a plane through the longitudinal axis X. Each indentation terminates at a terminal position 50 spaced from the end of the billet. From the terminal position the indentation increases in depth towards the end of the billet. Eventually the end of the billet is nearly closed by the indentations. The walls of each indentation are close together and the bases of the indentations almost meet at the centre of the tube.

In the example shown the height of the end of the tube presented to the rolls after the indentations are formed is about 80 mm. The shape and the diminished height makes entry of a billet into the rolling mill rolls substantially easier. The "angle of bite" is reduced from about 63° to 58°. The tube will moreover be closed more efficiently by the rolls with a lower incidence of "fish tails" which again eases the entry of the billet between subsequent rolls and the exit therefrom. In the case of a billet with a jacket made entirely of stainless steel the length of the defective ends of the rolled product which are cut off and discarded is also reduced.

It is not intended that the scope of a patent granted on the application of which this specification forms a part should exclude modifications and/or improvements which are within the spirit of the invention as defined in the claims appended hereto or be limited by details of the embodiments described and/or illustrated further than is necessary to distinguish the invention from the prior art.

What I claim is:

1. A billet comprising a mass of compressed swarf jacketed in a tubular jacket, wherein adjacent at least one end of the billet a number of substantially similar indentations are formed in the jacket, each of which indentations terminates at a terminal position spaced from the said one end of the billet and which increases in depth from the terminal position to the said one end of the billet.

2. A billet according to claim 1, wherein it has a longitudinal axis about which the indentations are symmetrically disposed.

3. A billet according to claim 1, wherein the jacket comprises a first portion joined to an end piece in which the indentations are formed, the first portion and the end piece being of materials of different composition.

4. A billet according to claim 3, wherein the first portion is of stainless steel.

5. A billet according to claim 4, wherein the end piece is of engineering steel.

6. A billet according to claim 2, wherein each indentation comprises two walls which are symmetrically disposed one on either side of a line of intersection lying in a plane through the longitudinal axis.

* * * * *